April 29, 1958 W. K. DOW 2,832,232
SPEED CONTROL DEVICE
Filed June 23, 1954
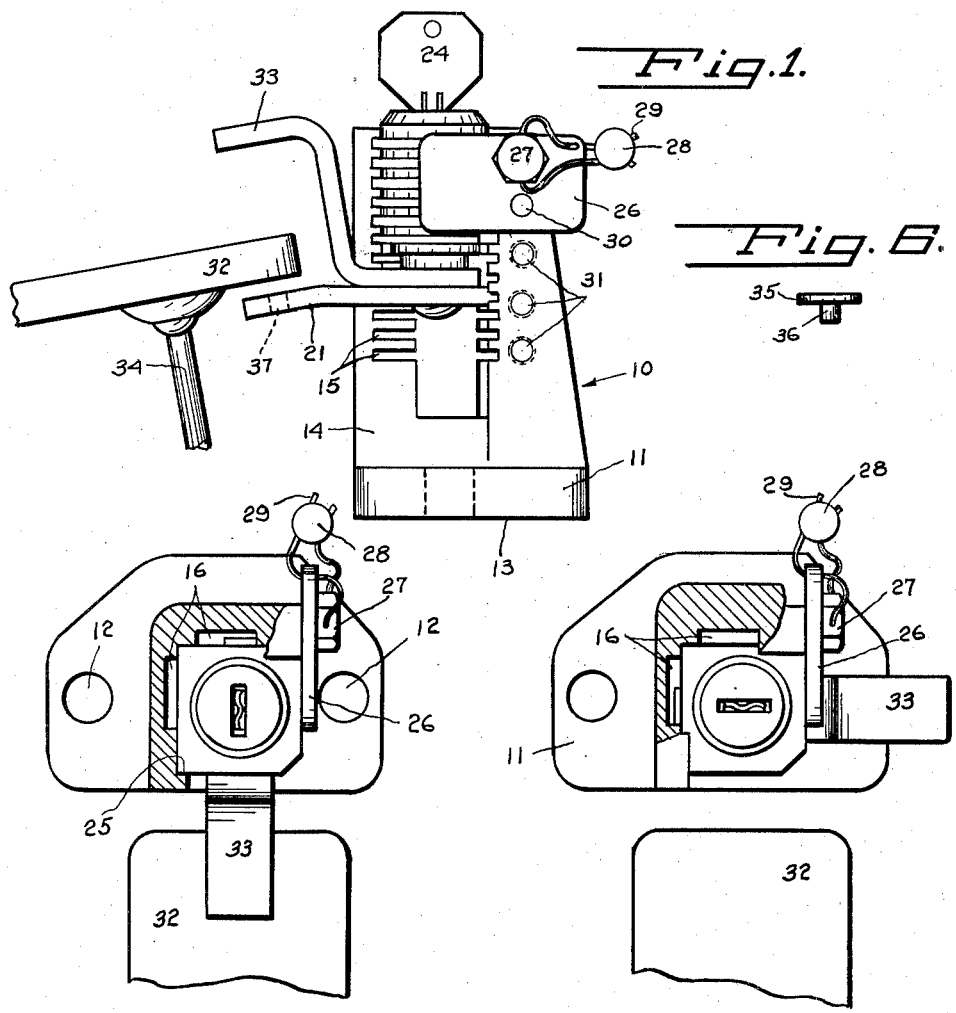
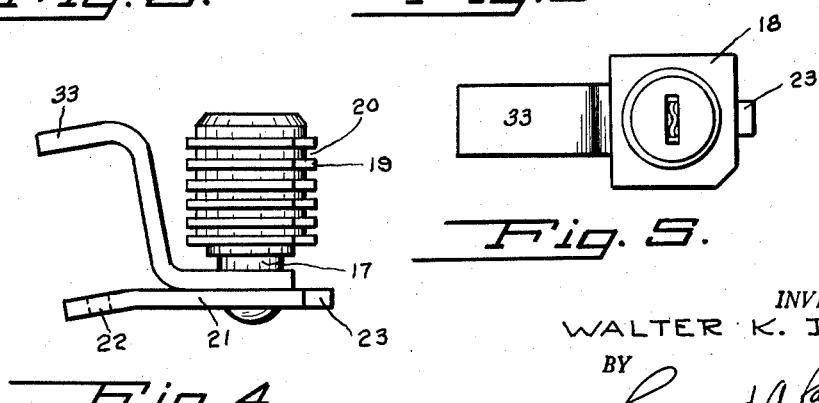
INVENTOR.
WALTER K. DOW
BY
Raymond A. Paquin
ATTORNEY.

United States Patent Office 2,832,232
Patented Apr. 29, 1958

2,832,232

SPEED CONTROL DEVICE

Walter K. Dow, Thompsonville, Conn.

Application June 23, 1954, Serial No. 438,848

9 Claims. (Cl. 74—526)

This invention relates broadly to means for controlling vehicular speeds and more particularly to such a means whereby the speed range of the vehicle, which is controlled by an accelerator or lever or the like, can be readily and easily set or released from said speed range.

An object of the invention is to provide an accessory of relatively simple design whereby the accelerator of a vehicle may be limited in its range of movement within a range from idle or slowest operable speed to a predetermined maximum.

Another object is to provide a relatively simple and inexpensive device for limiting and assuring a maximum operable speed and which device can be quickly and easily installed and adjusted or set by a person of very limited mechanical ability.

Another object is to provide a device of the type set forth whereby the speed range of the car can be readily and easily changed or adjusted.

Another object is to provide a speed control device of relatively simple and inexpensive construction that can be readily and economically installed in the body of a vehicle and outside of the engine compartment.

Another object is to provide a speed control device of the type set forth which is adjustable to desired speed range and which can be easily and quickly adjusted to desired speed range.

Another object is to provide a device of the type set forth which may be locked in adjusted or set position and whereby the lock member of the device can be removed or moved to inoperative position while in the unlocked position but which becomes permanent or fixed in operative relation when in the locked position.

Another object is to provide a relatively simple and inexpensive accessory adapted to be installed on the floor board or fire wall of the vehicle and by means of which a predetermined maximum speed for the vehicle may be set and secured by lock and key and which tends to prevent removal of the accelerator pedal from the carburetor control rod.

Another object is to provide a device of the type set forth which can be permanently installed in a vehicle for setting and securing through a key locking means a predetermined speed range for the vehicle by one turn of a key or the like, and which is adapted to release or return to normal speed range of the vehicle by another turn of the key or locking means.

Other objects and advantages of the invention will be apparent from the following description taken in connection with the accompanying drawings. It will be understood that changes may be made in the details of construction and arrangement of parts shown and described without departing from the spirit of the invention as set forth in the accompanying claims, and the preferred form has been given by way of illustration only.

Referring to the drawings:

Fig. 1 is a side elevation view showing the device installed in operative relation with an automobile or other engine accelerator;

Fig. 2 is a top or plan view of the device shown in Fig. 1 and showing the device in the locked or controlled speed range;

Fig. 3 is a view similar to Fig. 2, but showing the device in the unlocked or normal speed range position;

Fig. 4 is a side elevation view of the lock means;

Fig. 5 is a top or plan view of the lock means shown in Fig. 4; and

Fig. 6 is a side view of an adjustment spacer which may be used for changing the adjustment ratio.

Referring more particularly to the drawings wherein similar reference characters designate corresponding parts throughout, 10 designates the base support of the invention and comprising a casting having a flange portion 11 containing mounting holes 12 and the device is adapted to be secured to the floor board of a vehicle, or the like, by bolts or screws through mounting holes 12 and to be secured upon mounting face 13. Extending from flange portion 11 and at right angles to flange 11 is a 90° coaxial aperture 14, a cross section of which is seen in Figs. 2 and 3 and in which are located a series of equally spaced slots 15 approximately the full length of said 90° aperture 14. Adjacent thereto and forming a part of said vertical aperture but only extending a portion of the full length thereof, is a chamber or vertical slot 16 which will be seen particularly in Figs. 2 and 3.

The locking means, which is shown particularly in Figs. 4 and 5, comprises a lock barrel 17 having a square or otherwise shaped body 18 of equally spaced tongues 19 and grooves 20, so made as to mesh readily with the grooves 15 in the body 10. A lock arm 21 having spacer hole 22 and projection 23 is permanently fastened to lock barrel 17 and is operable through 90° of movement in relation to lock body 18 by use of a lock key 24. The tongues 19 and grooves 20 need only be on the sides of the lock engaging base 10.

When the locking means of Figs. 4 and 5 is entered into the 90° coaxial aperture of the body 10, it is retained in adjusted position relative to the body 10 by means of the selected set of grooves 15 and retained therein in one direction by groove ends or flange 25 and the clip 26 which is clamped firmly to body 10 by cap screw 27 and sealed by lead seal 28 joining the ends of wire 29 for passing through an opening in the cap screw 27. The clip 26 is also provided with the locating pin 30 adapted to be positioned in any of the various holes 31 depending upon the adjusted position of clip 26 and below the hole into which extends cap screw 27 which can be moved up or down on the body to coincide with the desired adjusted position of the locking member.

It will be noted that the wire 29 extends through an opening in clip 26 so that cap screw 27 cannot be unscrewed without breaking wire 29.

Referring again to Fig. 1 of the drawings, it will be seen that when the invention is properly mounted in the vehicle relative to accelerator 32, that the downward adjustment or movement of the accelerator pedal 32 can be readily limited to the adjusted position of lock arm 21 which is adjusted according to the position of the locking means in grooves 15 of body 10 and a wide range of positions in relation to mounting face 13 can be achieved.

If desired, a second lock arm 33 may be provided above arm 21 to limit the upward movement of accelerator 32 and thereby prevent its removal from carburetor control rod 34.

When the body 10 is permanently mounted in the car it is desirable to position the locking means shown in Figs. 4 and 5 in the body 10 so that when in locked position, arm or member 21 allows a slight downward movement of the accelerator pedal 32 and clip 26 may then be mounted on the body by cap screw 27 but not sealed. The vehicle can now be tried for maximum speed and if the speed is too slow, the locking means may be lowered the desired number of grooves and reclamped by clip 26. Upon final adjustment to desired maximum speed, the clip 26 may be sealed by the wire 29 and lead seal 28 to permanently position the locking means in said adjusted position at which point it cannot be removed without destroying the seal 28 or wire 29.

If in the process of adjustment it is found that a change of one groove increases the speed beyond the desired amount, a spacer rivet 35 shown in Fig. 6 and having a flange thickness of a fraction of the width of grooves 15 can be positioned with the rivet extension portion 36 in hole 37 and with the spacer portion 35 on top of member 21 and the extension 36 can then be peaned over, whereupon the spacer rivet becomes a permanent part of arm 31 and changes its dimensional relationship with the groove 15 and thus provides another variation of adjustment of the locking means.

When the locking means is placed in the unlocked position of Fig. 3 by a 90° turn of key 24, it will be seen that the device does not in any way disturb the normal functioning of the accelerator and allows the car to be operated throughout its normal speed range.

When it is desired to limit the speed range of the vehicle, the key and locking member are turned 90° from the position shown in Fig. 3 to that shown in Fig. 2 and with the key removed, the range of speed is controlled throughout control of the limit of movement of the accelerator 32.

From the foregoing it will be seen that I have provided new and improved means for obtaining all of the objects and advantages of the invention.

I claim:

1. For use in combination with an engine accelerator pedal, a control device adapted to be positioned in operative relation to said accelerator pedal, said control device comprising a support for connection to the floor of the vehicle, or the like, said support having a portion extending upwardly therefrom, said upwardly extending portion having a series of vertically spaced slots, a locking device having a limiting portion adapted to cooperatively function with the accelerator pedal for limiting the movement thereof when said limiting portion is in operative position, said locking device having a series of projections adapted to extend into certain of said slots on said support and means for locking said locking device in adjusted position on said support.

2. For use in combination with an engine accelerator pedal, a control device adapted to be positioned in operative relation to said accelerator pedal, said control device comprising a support for connection to the floor of the vehicle, or the like, said support having a portion extending upwardly therefrom, said extension portion having a series of vertically spaced slots, a locking device having a limiting portion adapted to cooperatively function with the accelerator pedal for limiting the movement thereof when said limiting portion is in operative position, said locking device having a series of projections adapted to extend into certain of said slots on said support and means for locking said locking device in position on said support, and a key operated lock for positioning the locking device limiting portion.

3. For use in combination with an engine accelerator pedal, a control device adapted to be positioned in operative relation to said accelerator pedal, said control device comprising a support for connection to the floor of the vehicle, or the like, said support having a portion extending upwardly therefrom, said extension portion having a series of spaced slots, a locking device having a limiting portion adapted to cooperatively function with the accelerator pedal for limiting the movement thereof when said limiting portion is in operative position, said locking device having a series of projections adapted to extend into certain of said slots on said support and means for locking said locking device in position on said support, said upwardly extending portion of said base having a substantially 90° coaxial aperture formed therein with said slots formed on the inner surfaces of said portion.

4. For use in combination with an engine accelerator pedal, a control device adapted to be positioned in operative relation to said accelerator pedal, said control device comprising a support for connection to the floor of the vehicle, or the like, said support having a portion extending upwardly therefrom, said extension portion having a series of spaced slots, a locking device having a limiting portion adapted to cooperatively function with the accelerator pedal for limiting the movement thereof when said limiting portion is in operative position, said locking device having a series of projections adapted to extend into certain of said slots for locking said locking device in position on said support, said extension portion of said support having a coaxial aperture formed therein with said slots formed on the inner surfaces of said extension portion and locking means for locking said limiting portion relative to said support.

5. For use in combination with an engine accelerator pedal, a control device adapted to be positioned in operative relation to said accelerator pedal, said control device comprising a support for connection to the floor of the vehicle, or the like, said support having a portion extending upwardly therefrom, said extension portion having a series of spaced slots, a locking device having a limiting portion adapted to cooperatively function with the accelerator pedal for limiting the movement thereof when said limiting portion is in operative position, said locking device having a series of projections adapted to extend into certain of said slots for locking said locking device in position on said support, said extension portion of said support having a substantially 90° coaxial aperture formed therein with said slots formed on the inner surfaces of said extension portion and locking means for locking said locking device in adjusted position on said support and allowing adjustment of said locking device out of operative position to allow free use of the accelerator pedal.

6. For use in combination with an engine accelerator pedal, a control device adapted to be positioned in operative relation to said accelerator pedal, said control device comprising a support for connection to the floor of the vehicle, or the like, said support having a portion extending upwardly therefrom, said extension portion having a series of spaced slots, a locking device having a limiting portion adapted to cooperatively function with the accelerator pedal for limiting the movement thereof when said limiting portion is in operative position, said locking device having a series of projections adapted to extend into certain of said slots for locking said locking device in position on said support, said extension portion of said support having a substantially 90° coaxial aperture formed therein with said slots formed on the inner surfaces of said extension portion and means for sealing said locking device in adjusted position on said support.

7. In a device of the character described, a support adapted to be rigidly secured to the floor board of a vehicle adjacent the accelerator pedal thereof, said support having a plurality of vertically spaced slots, an adjustable member adapted to be secured in adjusted relation to said support, said adjustable member having means engaging certain of said slots and means for limiting the extent of movement of said accelerator pedal in one direction, said limiting means having a projection adapted to engage a selected slot in said support.

8. In a device of the character described, a support adapted to be rigidly secured to the floor board of a vehicle adjacent the accelerator pedal thereof, said support having a plurality of vertically spaced slots, an adjustable member adapted to be secured in adjusted relation to said support, said adjustable member having means engaging certain of said slots and means for limiting the extent of movement of said accelerator pedal in one direction, said limiting means having a projection adapted to engage a selected slot in said support, said adjustable means being key operated whereby said projection may be locked in operative relation to said support or pivoted out of operative position whereby said limiting means are simultaneously moved out of operative relation with said accelerator pedal.

9. In a device of the character described, a support adapted to be rigidly secured to the floor board of a vehicle adjacent the accelerator pedal thereof, an adjustable member adapted to be secured in adjusted position relative to said support, said adjustable member having means for limiting the extent of movement of said accelerator pedal in one direction, said means having a projection adjacent its opposite end adapted to engage said support and complementary slots and grooves in the adjacent surfaces of said support and adjustable member whereby said adjustable member may be positioned in desired adjusted position relative to said support.

References Cited in the file of this patent

UNITED STATES PATENTS

| | | |
|---|---|---|
| 2,124,683 | Abele | July 26, 1938 |
| 2,165,897 | Liley | July 11, 1939 |
| 2,207,435 | Jones | July 9, 1940 |
| 2,230,527 | Crawford et al. | Feb. 4, 1941 |

FOREIGN PATENTS

| | | |
|---|---|---|
| 682,110 | France | Feb. 10, 1930 |